United States Patent [19]

Hensler et al.

[11] 4,151,508

[45] Apr. 24, 1979

[54] VEHICLE THEFT PROTECTION ARRANGEMENT

[75] Inventors: Paul Hensler, Stuttgart; Wolfgang Eyb, Leonberg; Richard Hetmann, Tamm; Hermann Burst, Rutesheim, all of Fed. Rep. of Germany

[73] Assignee: Porsche AG, Fed. Rep. of Germany

[21] Appl. No.: 840,152

[22] Filed: Oct. 7, 1977

[30] Foreign Application Priority Data

Oct. 7, 1976 [DE] Fed. Rep. of Germany ....... 2645227

[51] Int. Cl.² .................. B60R 25/04; G08B 13/22
[52] U.S. Cl. ................................. 340/64; 307/10 AT; 180/114
[58] Field of Search ............................ 340/53, 63, 64; 307/10 AT; 180/114

[56] References Cited

U.S. PATENT DOCUMENTS

| | | | |
|---|---|---|---|
| 3,541,505 | 11/1970 | Lee | 340/64 |
| 3,710,317 | 1/1973 | Colsen et al. | 340/64 |
| 3,781,789 | 12/1973 | Caleskie et al. | 340/64 |

Primary Examiner—Alvin H. Waring
Attorney, Agent, or Firm—Craig & Antonelli

[57] ABSTRACT

A theft protection arrangement for motor vehicles which includes a lock system having a main key and an auxiliary key. Electrical contact switches are operatively associated with at least one of a vehicle door, a vehicle hood, and a vehicle lid for monitoring the conditions thereof. An electrical switching apparatus operatively connects the electrical contact switches with the lock system such that, during an unauthorized entry of the vehicle door, vehicle hood, or vehicle lid, an alarm system is activated and/or parts of the vehicle necessary for a driving operation are disconnected.

10 Claims, 4 Drawing Figures

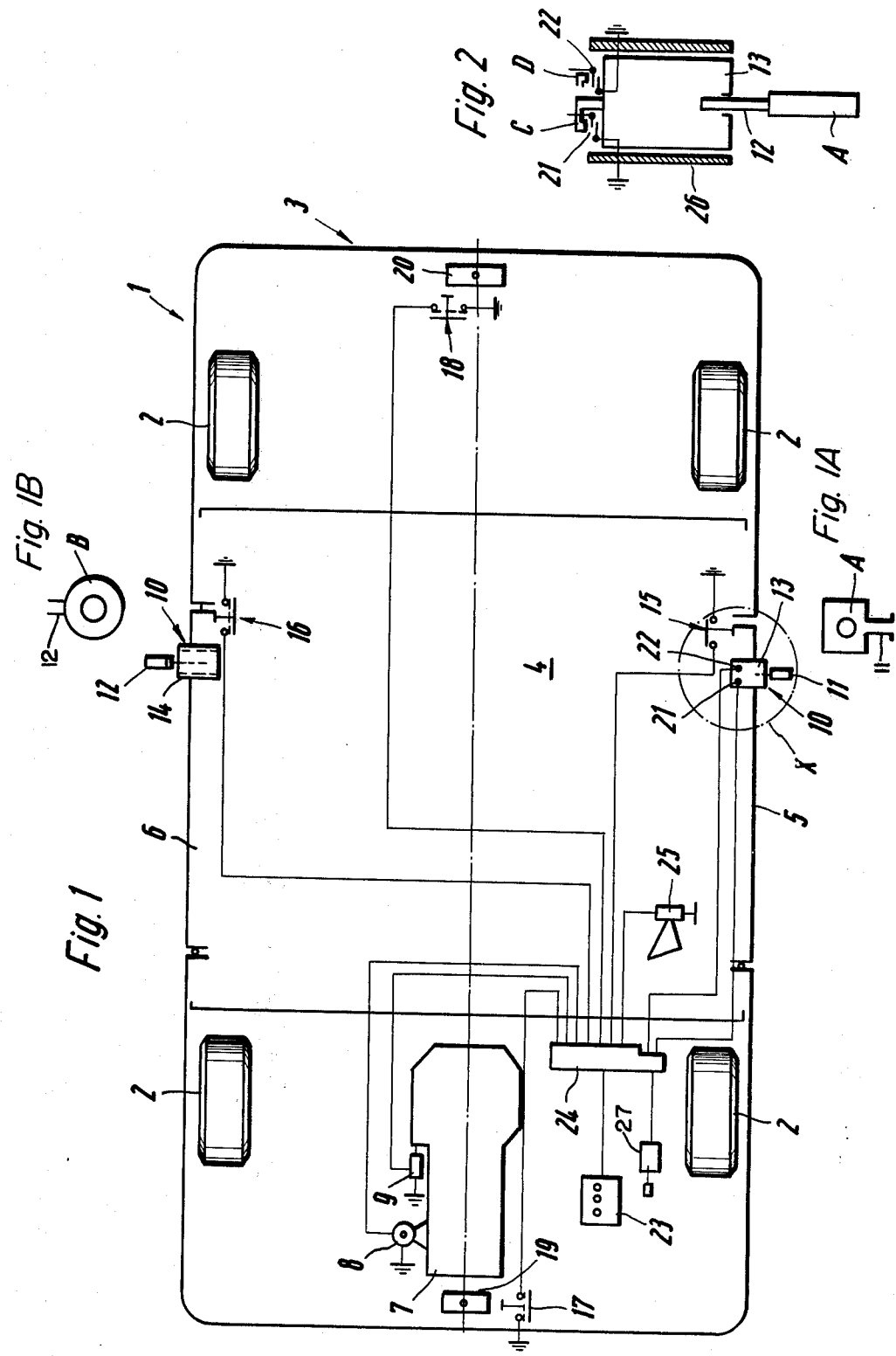

VEHICLE THEFT PROTECTION ARRANGEMENT

The present invention relates to a theft arrangement and, more particularly, to a theft protection arrangement for motor vehicles.

The ever-increasing number of vehicle thefts provides a clear indication that known theft protection measures such as mechanical door locks combined with ignition-starting lock devices are considerably inadequate. In most cases, an entry into the passenger compartment of a motor vehicle presents no great problem for either the safety lever of the door, hood or lid lock is released from the outside by expedient means, such as for example, a screwdriver, or the door side window is broken. Another common practice is the unauthorized duplication of keys of the vehicle which could occur, for example, during a stay at a vehicle work shop whereby it becomes extremely easy for a thief to steal the motor vehicle by simply using the duplicated key.

The aim underlying the present invention essentially resides in providing a theft protection arrangement by which not only is unauthorized entry into a motor vehicle considerably difficult but also a starting of the motor vehicle is made also impossible.

According to one feature of the present invention, a lock system is provided which includes a main key and an auxiliary key with the lock system being combined with or connected to an electric switching apparatus and electrical switch contacts in such a way that an unauthorized opening of a door, a hood, a vehicle lid, or vehicle windows, or the like results in the actuation of an alarm system and/or a disconnection of the devices necessary for the operation of the motor vehicle. Advantageously, the contact switches are arranged at the doors, hood, vehicle lid, or the like so as to monitor the condition of these elements once the vehicle is secured with all of the contact switches being connected with the switching apparatus.

In accordance with another feature of the present invention, to facilitate a ready identification of the main key and the auxiliary key of the theft protection arrangement and to minimize the chances of erroneous delivery of the main key to third persons who may duplicate the same, the main key and auxiliary keys have variably shaped grip portions.

According to a still further feature of the present invention, the theft protection arrangement includes a lock system having a closing cylinder mounted at a door of the vehicle with the closing cylinder being connected to the switching apparatus through protection gas contacts. To avoid activation of the protection contacts by an external source such as, for example, a magnet, a sleeve, preferably of steel, surrounds the protection contacts.

One advantage obtained with the theft protection arrangement of the present invention resides in the fact that not only is entry into the passenger compartment considerably difficult for a thief but also the starting of a motor vehicle is virtually impossible.

A further advantage of the present invention resides in the fact that only the auxiliary key need be furnished to a repair shop for possible servicing of the motor vehicle with the main key remaining in the possession of the motor vehicle owner.

Yet another feature of the present invention resides in the fact that, even if a theif forcibly gains access to the passenger compartment of the vehicle by, for example, breaking side windows of the vehicle and thereafter opens a vehicle door, the alarm system is automatically actuated through the contact switches and the switching apparatus whereby the devices necessary for the operation of the vehicle such as, for example, a gasoline pump, starter, etc., are disconnected or otherwise rendered inoperative.

Accordingly, it is an object of the present invention to provide a theft protection arrangement which avoids by simple means the shortcomings and disadvantages encountered in the prior art.

Another object of the present invention resides in providing a theft protection arrangement which minimizes if not avoids unauthorized entry into a motor vehicle.

A still further object of the present invention resides in providing a theft protection arrangement which functions reliably under all operating conditions.

Another object of the present invention resides in providing a theft protection arrangement which is simple in construction and therefore inexpensive to manufacture.

A still further object of the present invention resides in providing a theft protection arrangement for motor vehicles which can be overridden only by employing a main key designed to deactivate the system.

These and other objects, features and advantages of the present invention will become more apparent from the following description when taken in connection with the accompanying drawing which shows, for the purposes of illustration only, one embodiment in accordance with the present invention and, wherein:

FIG. 1 is a schematic illustration of a vehicle theft protection arrangement in accordance with the present invention;

FIGS. 1A and 1B are schematic representations of grip portions of a main key and an auxiliary key for the theft protection arrangement of FIG. 1; and FIG. 2 is an enlarged partial cross-sectional detailed view of an area designated by the character X in FIG. 1.

Referring now to the drawings wherein like reference numerals are used throughout the various views to designated like parts, and more particularly, to FIG. 1, according to this figure, a motor vehicle generally designated by the reference numeral 1 includes wheels 2, a superstructure generally designated by the reference numeral 3, and a passenger compartment 4 which is accessible to by doors 5, 6. An internal combustion engine 7 is arranged in the motor vehicle and provides a source of driving power therefor with a gasoline pump 8 and a starter 9 being operatively connected with the internal combustion engine 7 in a known manner.

The doors 5, 6 are provided with a lock system generally designated by reference numeral 10 which includes a main key 11 and an auxiliary key 12 which are insertable into closing cylinders 13, 14. As shown in FIGS. 1A and 1B, the main and the auxiliary keys 11, 12 are provided with differently shaped grip portions A, B, respectively, so as to facilitate an identification of the respective keys.

The main key 11 is employed to unlock an ignition-starting lock arrangement (not shown) in a conventional manner and is also employed to operate the closing cylinders 13, 14. The auxiliary key 12 serves merely for the operation of the closing cylinder 14 and the release of the ignition-starting lock arrangement.

Electric contact switches generally designated by the reference numerals 15, 16 are provided at the doors 5, 6 with additional electric contact switches generally designated by the reference numerals 17, 18 being arranged at a hood lock 19 and a lid lock 20. The electric contact switches 15, 16, 17, 18 are constructed so as to be normally closed and function to monitor a condition of the doors 5, 6, hood and lid of the motor vehicle 1.

The closing cylinder 13 is provided with electrical contacts 21, 22 connected to a switching apparatus 24 supplied by a source of power such as, for example, a battery 23 of the motor vehicle. The contact switches 15, 16 provided at the doors 5, 6 and the contact switches 17, 18 arranged at the hood and lid locks are also connected to the switching apparatus 24. The switching apparatus 24 is connected to the gasoline pump 8, the starter 9 and an alarm system constructed as, for example, an auxiliary horn 25.

The contacts 21, 22 of the closing cylinder 13 are constructed as protection gas contacts and, in order to avoid actuation or closing of the contacts 21, 22 from outside of the motor vehicle 1 by, for example, a magnet, a sleeve 26 is provided which surrounds the closing cylinder 13 and shields the contacts 21, 22.

The locking or theft protection system of FIG. 1 functions in the following manner. If the motor vehicle 1 is to be secured or locked, the doors 5, 6 and also the hood and the lid are closed which results in the contact switches 15, 16, 17, and 18 being opened. The closing cylinder 13 is then brought from the open position C into a closed position D (FIG. 2) by rotation of the main key 11 whereby the switching apparatus 24 is connected to the contact switches 15, 16, 17, 18, the starter 8, the gasoline pump 9 and the auxiliary horn 25.

Once the vehicle is secured or locked, if one of the contact switches 15, 16, 17, 18 is closed which would occur when, for example, an unauthorized person opens the doors, hood or lid of the vehicle, the switching apparatus 24 receives an impulse whereby the auxiliary horn 25 is operated and/or the starter 8 and the gasoline pump 9 are disconnected from the battery 23. If an attempt is made to override or render ineffective the theft protection arrangement by, for example, subsequently closing the doors, hood or lids so as to open the electrical contact switch associated therewith, the switching apparatus 24 becomes effective in such a way that a safety or theft-proof condition is maintained, that is, the auxiliary horn 25 remains operative and/or the starter 8 and gasoline pump 9 remain disconnected.

The safety or theft-proof condition effected by the switching apparatus 24 can only be avoided or abolished when a corresponding impulse is given to the switching apparatus 24 from a lock 27 connected thereto and the contact 21 of closing cylinder 13 of lock system 10, which impulse would occur upon an opening of the lock system 10 and lock 27 by returning the closing cylinder 13 to the open position C.

It is also possible in accordance with the present invention to provide additional contact switches at, for example, other portions of the motor vehicle and/or disconnect or block other auxiliary aggregates and service parts of the motor vehicle other than the vehicle starter 8 and gasoline pump 9.

While we have shown and described only one embodiment in accordance with the present invention, it is understood that the same is not limited thereto but is susceptible of numerous changes and modifications as known to one skilled in the art and we therefore do not wish to be limited to the details shown and described hereinabove but intend to cover all such modifications as are encompassed by the scope of the appended claims.

We claim:

1. A theft protection arrangement for vehicles, the vehicles being provided with vehicle doors having closing cylinders mounted therein, the arrangement including a lock system having a main key for locking and unlocking an ignition-starting lock arrangement as well as locking and unlocking the closing cylinders of the vehicle doors and for controlling an operation of the theft protection arrangement, and an auxiliary key for locking and unlocking only one of the closing cylinders and the ignition-starting lock arrangement, electrical contact switch means operatively associated with at least one of the vehicle doors, a vehicle hood, and a vehicle lid for monitoring a condition thereof, electrical contact means provided at one of the closing cylinders other than the closing cylinder which is lockable by the auxiliary key, the electrical contact means being operable by the main key so as to activate and deactivate the theft protection arrangement, and an electrical switching means operatively connected with said electrical contact switch means and the electrical contact means for at least one of activating an alarm system and disconnecting at least one means necessary for an operation of the vehicle upon an unauthorized entry of the vehicle doors, a vehicle hood, or a vehicle lid.

2. A theft protection arrangement according to claim 1, wherein the main key and the auxiliary key have grip portions, and wherein said grip portions are differently shaped.

3. A theft protection arrangement according to claim 1, wherein said electrical contact switch means are mounted at the vehicle doors, vehicle hood, and vehicle lid such that, upon a locking of the vehicle by the main key, an opening of at least one of the vehicle doors, vehicle hood or vehicle lid provides an impulse indicative of the opening to the electrical switching means.

4. A theft protection arrangement according to claim 3, wherein means are provided for shielding said electrical contact means from an external actuation.

5. A theft protection arrangement according to claim 4, wherein said shielding means includes a sleeve surrounding said electrical contact means.

6. A theft protection arrangement according to claim 5, wherein said sleeve is made of a steel material.

7. A theft protection arrangement according to claim 2, wherein means are provided for shielding said electrical contact means from an external actuation.

8. A theft protection arrangement according to claim 1, in a vehicle including a battery, a gasoline pump, and a starter, the gasoline pump and the starter constituting means necessary for an operation of the vehicle, wherein the gasoline pump and the starter are operatively connected with said electrical switching means and the battery such that an unauthorized entry of the vehicle disconnects the gasoline pump and the starter from the battery.

9. A theft protection arrangement according to claim 1, wherein an unauthorized entry of the vehicle activates an alarm system and disconnects the at least one means necessary for an operation of the vehicle.

10. A theft protection arrangement according to claim 1, wherein a lock means is operatively connected to the electrical switching means for providing an override impulse thereto, the impulse only being effective to deactivate the theft protection arrangement if the main key unlocks the closing cylinder provided with the electrical contact means.

* * * * *